April 20, 1954    A. C. MATHIEU    2,675,921
FILTER PRESS AND HANDLE
Filed Jan. 27, 1950
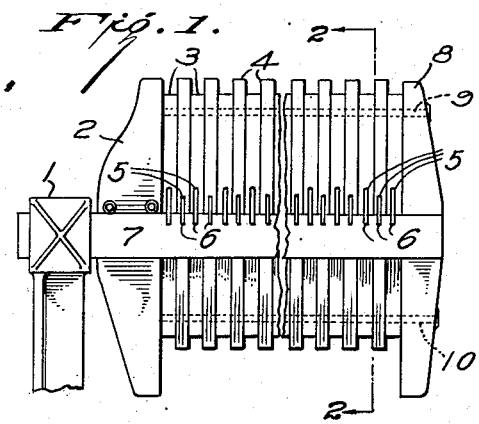
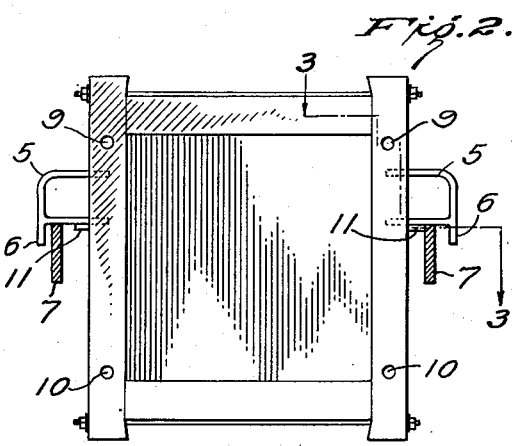
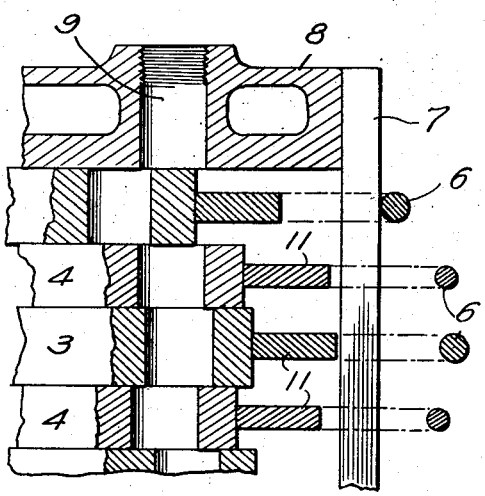
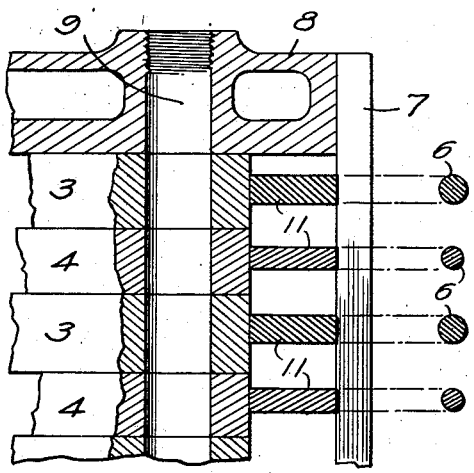
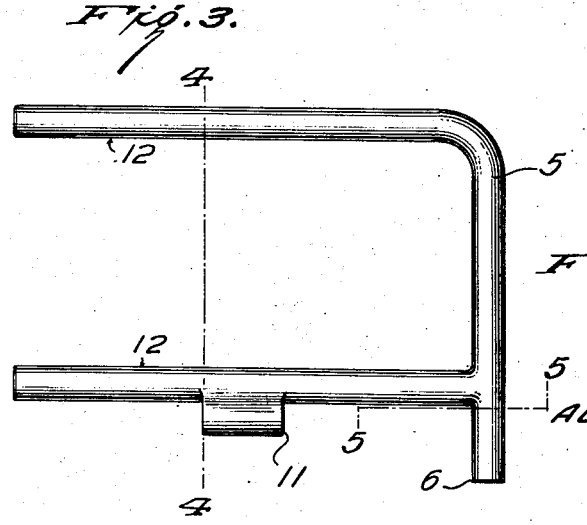
INVENTOR
ALFRED C. MATHIEU,
BY
ATTORNEY Patented Apr. 20, 1954

2,675,921

UNITED STATES PATENT OFFICE 2,675,921

FILTER PRESS AND HANDLE

Alfred C. Mathieu, South Bound Brook, N. J., assignor to American Cyanamid Company, New York, N. Y., a corporation of Maine Application January 27, 1950, Serial No. 140,817

1 Claim. (Cl. 210—188)

This invention relates to a novel handle for wooden filter press plates and frames, and to the novel combination of this handle with these filter press elements.

Filter presses have been used for well over a century in the chemical industry for freeing liquids or sludges from particulate matter held in suspension therein.

In its large industrial form a filter press commonly comprises a series of substantially square wooden frames and plates, often as large as five feet on a side, which are arranged in alternate sequence between a sliding compression head and a fixed end head. The filter plates provide a solid backing for squares of filter cloth and contain channels and other means for drainage of the filtrate. The frames act as spacers to provide chambers for the accumulation of the filter press cake which collects on the filter cloth. Each of the plates and frames, together with the fixed end head, contains at least one accurately placed conduit section so that when the plates and frames are set up in alignment with the fixed end head, one continuous conduit is formed for admission of the feed which enters through the end head. Usually four conduit sections are provided to serve various purposes, one in each corner of each plate and frame.

Each plate and frame is supported by two metal grips, hereafter called "filter press handles," located at about the midpoint of the opposite vertical sides thereof. These grips or handles rest in sliding contact with and are supported by the two horizontal rails of the press. The primary function of these rails, however, is to connect the sliding compression head with the fixed end head.

In operation, the assembly of frames and plates arranged alternately, each plate bearing a filter cloth as described above, is subjected to very great horizontal pressure by means, for example, of a hydraulic ram acting on the sliding compressing head until water tightness is effected. The liquid to be filtered is then pumped under pressure through this assembly, a portion of the liquid entering each frame, passing through the filter cloth, and leaving through each adjacent plate by way of an orifice leading to one of the conduit sections. It is an essential step, preliminary thereto, that all the conduit sections of the frames and plates be brought into accurate registration among themselves and with the conduit sections which pass through the fixed end head.

Upon completion of each filtration, the horizontal pressure is relieved, the sliding compressing head is backed off, and the frames are separated from the plates in sequence, beginning with the plate next to the compressing head. The press cake contained in each frame is knocked out and falls into a hopper directly below the press.

When filtration of a whole batch of liquid is complete, the plates, frames and filter cloths are inspected and are carefully washed by pumping an appropriate solution through the reassembled press. These solutions often are of a highly reactive nature.

The removal of filter cake from the frames, mentioned above, is attended by some danger, and in detail proceeds substantially as follows. First, the compression plate is backed off sufficiently to give free play to the terminal wooden plate, as mentioned above. Then, two men, one on each side of the press, give the two handles of this plate a strong, sharp, twisting and pulling motion to free this plate from its adjoining frame and to slide it along the two horizontal rails of the press until it contacts the head. This exposes the first frame, which is freed by a similar twist and pull and is slid along the rails to the point where the filter cake it contains can be knocked out freely. The empty frame is then slid along the rails until it contacts the plate first moved. This exposes the second plate, which is freed and moved as was the first. The remaining frames are moved, cleaned, and moved in sequence together with the plates, as described in the case of the first plate and frame, until all the plates have been moved and all the frames have been cleaned.

Occasionally, however, it becomes necessary to free a frame or plate from a point near the middle of the filter press assembly. This usually occurs when a frame starts to leak, or when one of the filter cloths fails. In such event, backing off the compression head as described above will not free the defective element because the series of highly compressed filter cloths and the wood act as an expansion spring, the whole assembly being subject to a pressure much in excess of 1,000 lb./in.$^2$ To free such an element an even greater twisting and pulling force is necessary, because it is often necessary in such event to slide a number of plates and frames along the supporting rails until full expansion of the filter cloths has been permitted and a sufficient degree of working space has been provided for the defective element.

In the past, filter press handles have been made of metal, usually cast iron or a corrosion resistant alloy of iron. They terminate in a sturdy, integrally cast footing which bears two appropriately spaced small holes in vertical alignment, one at each of the extremities of this footing, and a large central boss located at the central portion thereof. To attach one of these handles, one broad, shallow hole and two narrow, deep holes are drilled into the wood of the plate or frame. The latter two small, deep holes serve as guides for wood lag screws which are inserted through the holes in the footing. The one broad, shallow hole receives the central boss, upon which the largest part of the weight of the frame or plate is supported.

The twisting force and pulling force which is exerted upon the thin screws is very large. For example, a filter press frame of ordinary commercial size, for example 48" x 48" x 2" made of hardwood as is conventional, will weigh, when loaded with press cake, about 185 pounds. This weight must be skidded along the rails.

In the past, difficulties ranging from slight to serious have been encountered with handles of the above-described type. In the first place, they are troublesome to install, requiring the drilling of two holes of two different sizes, and the procurement and installation of screws. These are relatively minor disadvantages.

The really serious disadvantages are those which flow from the fact that the screws constantly loosen in service. This loosening does not occur at once, but is delayed until the wooden frames and plates have long been subjected to alternate dry and wet conditions, to alternate compression and expansion, and to corrosive chemicals, and until the handles have been subjected repeatedly to the strong twisting and pulling forces described above. Under these conditions the screws loosen, requiring constant inspection and replacement. Since the rate of this loosening is unpredictable, and since no inspection system is ever perfect, frequently screws drop out undetected, fall into the press cake hopper or trough, and cause serious contamination of the filter cake by their immediate chemical reaction, even if they are removed later. This contamination is most objectionable in the case of dyes and pharmaceuticals, where even slight contamination may result in the rejection of an entire production batch. Where the filter cake is subject to further processing, as in a micropulverizer or pelleting machine, a screw which has not been removed will ruin valuable elements of the processing equipment.

A particular disadvantage associated with the above occurs when the operator gives the handle the strong twist, referred to above, to separate a frame or plate from its neighbor or to slide it along the supporting rail to a convenient place for cleaning or repair. When the top screw has loosened sufficiently, the upper part of the handle is torn loose and the whole handle pivots about the bottom screw in the direction of the twist. The bottom screw rarely comes out in these circumstances because it is retained in place by the inner side of the horizontal rail of the press. Ordinarily, in freeing a plate or frame, the worker puts his whole muscular effort into this twist, and when the upper screw pulls out, the handle is brought uncontrollably down upon the worker's thumb, crushing it against the square outer edge of the rail. In the past, this has caused complete fractures of the thumb bone. Other casualties such as tearing of the ligaments, contusions, bruisings, and abrasions require less force and have been correspondingly more frequent occurrences than complete fractures.

Where physiologically active materials, such as dyes and pharmaceuticals, are being filtered, secondary reactions and additional pain may occur unless prompt medical attention is given the injured worker.

The discovery has now been made that all of the above disadvantages can be readily and surprisingly simply overcome by fabricating a filter press handle having two substantially parallel and cylindrical studs extending from the handle portion thereof, and driving the studs into the edge of a filter press frame or plate into predrilled holes of substantially the same diameter as the diameter of the studs, so as to effect a tight, drive fit. Such a combination yields a product of enhanced durability, which requires virtually no inspection or maintenance.

It has further been found, most surprisingly, that the handle described above, when driven in as described, can neither be withdrawn from the wood by the exercise of the greatest twisting and pulling forces employed in the operation of filter presses, nor be rotated with respect to the wood. Instead of the handles becoming loose long before the life of the frames has expired (as is the case with conventional handles), the handles of the present invention remain firmly fixed on the filter press wood until the wood itself has deteriorated beyond possibility of repair. It is a particularly surprising and advantageous feature of the present invention that when this point has been reached, the handles usually can be withdrawn from the wood and re-used as if new. As a result, it has been found that this handle completely eliminates the occurrence of personal injuries such as smashed fingers, as described above.

It is a very important advantage that the handle of the present invention is inherently incapable of releasing any metal which can contaminate the product or cause damage to processing equipment.

It is a particular further advantage that this handle can be fabricated wholly by means of welding.

These and other advantages are illustrated in the drawing in which:

Fig. 1 is a side elevation of a conventional industrial filter press showing handles of the present invention;

Fig. 2 is a section along line 2—2 of Fig. 1 showing the front of one of the wooden frames of Fig. 1;

Fig. 3 is a horizontal section of the two terminal plates and frames and the fixed head of Fig. 1, taken along the planes of line 3—3 of Fig. 2, showing the conduit sections so completely out of registration that the normal channel of flow has been nearly completely blocked, and an aperture exists permitting leakage of the liquid from the press.

Fig. 4 represents the same view as that shown in Fig. 3, in which, however, the conduit sections have been brought into alignment; and Fig. 5 is a side elevation of a filter press handle of the present invention.

More in detail, Fig. 1 shows a side elevation of a commercial filter press. The terminal support, ram, and ram housing 1 are conventional, and are therefore shown in outline form. The two horizontal and parallel rails 7 rigidly connect fixed end head 8 with the housing 1. Plates 3 and frames 4, under compression by sliding compression head 2 and retained by fixed end head 8, are shown supported on the rails 7 by handles 5 and retained on the rails 7 by spurs 6. Each plate and frame is perforated by conduit sections 9 and 10 shown in horizontal alignment.

Fig. 2 is a front view of one of the wooden frames of Fig. 1. As in Fig. 1 the frame is shown supported by the two handles 5 of the present invention which rest on the two parallel rails 7 and which are retained on the rails by spurs 6, which prevent the frame from dropping from the press should the frame be twisted about its vertical axis. Conduit sections 9 and 10 have been brought into normal registration position by contact of one of the lugs 11 with the inner edge of one of the rails 7.

Fig. 3 is a section of one end of the filter press of Fig. 1 taken along the planes of line 3—3 of Fig. 2 showing fixed end head 8, conduit sections 9, plates 3, frames 4, rails 7, lugs 11, and spurs 6. In this view the conduit sections are completely out of registration as a consequence of failure of lugs 11 to contact the inner edge of rail 7, whereby flow of liquid through the press has become impossible.

Fig. 4 represents the same view as that shown in Fig. 3, all the conduit sections 9, however, having been brought automatically into registration by contact of all the lugs 11 with the inner edge of rail 7.

As shown in Fig. 4, the conduit sections of the frames must be brought into accurate registration with the corresponding conduit sections of the plates and the conduits thus formed must be brought into equally accurate registration with the corresponding conduit sections of the fixed end head. This registration is effected automatically when lugs 11 of predetermined length are employed. As seen from Fig. 4, the length of the lugs should be equal to the distance from the center of conduit section 9 to the inner edge of the nearest rail 7, minus the distance from the center of the conduit section to the nearest vertical edge of the wood.

The elevation of the handle shown in Fig. 5 represents the preferred embodiment of the handle of the present invention and shows the handle portion 5, two substantially parallel and cylindrical stud portions 12 which terminate and join the handle portion at line 4—4, and spur portion 6 terminating at line 5—5. In this drawing there is also shown lug 11 lying in the axis of the handle portion. This lug extends from the juncture of the lower stud with the handle portion, in the direction of the spur portion.

In its preferred embodiment the handle is made from three pieces of ordinary metal bar stock and the complete handle, including the lug if desired, may be made in this manner or cast or drop forged. It is a particular advantage of the present handle that it can be fabricated solely by means of welding.

It will be understood that the handle, as shown in the drawing, represents only one embodiment. Other embodiments may be devised. For example, the studs may be roughened or serrated, although it is a surprising advantage of the present invention that it is not necessary to do so. Moreover, the handle portion 5 may be of any conventional design and may be provided with a plastic covering, or with special grips. Similarly, the lug portion may be longer and deeper than shown. The spur need be at an angle of 90° with respect to the axis of the studs only where the rail has a vertical outer side, as shown. Where the base of the rail is wider than the top, the angle of the spur should be adjusted to conform, up to about 120° of divergence from the axis of the studs.

The dimensions of this handle are not critical. For small commercial plates and frames, that is for those about two feet square, rough round bar stock having a diameter of about ½ inch is satisfactory. For plates five feet square, ¾ inch stock may advantageously be used. Any metal having the necessary strength and chemical resistance can be employed. However, handles made from pipe are not advantageous as it may be necessary to seal the ends of the stud portion which otherwise would remain open and perhaps permit leakage of liquid from the press.

It is not necessary that the studs be perfectly parallel or that the holes into which they are fitted be drilled at exactly right angles to the frame as shown. In ordinary manufacture small divergences may happen and ordinarily these may be readily corrected by manually increasing or decreasing the distance between the studs while they are being inserted into the predrilled holes.

The diameter of the two holes into which the studs are driven is critical in the sense that a tight, drive fit should be assured. For example, when studs formed from unfinished steel bar stock ½ to ¾ inch in diameter are fitted into holes drilled in the side of ordinary new, dry, long leaf yellow pine filter press boards, the holes should be drilled with a drill having a diameter about 1/64 inch larger than the diameter of the stock used. In these circumstances the studs may be driven home securely with light blows of a heavy wooden mallet or sledge. Less clearance should be allowed in the case of machined or polished studs. The lug portion may be used as a simple stop to prevent too deep penetration into the wood but more advantageously it may be used as a means for automatically bringing into registration all the conduit sections of the filter press, as described above. When used in the latter way the length of the lug will depend on the dimensions of the filter press wood, as mentioned.

The center to center spacing of the studs ordinarily is about three inches for the smaller plates and frames, rising to five inches in the case of the larger. Studs having a length of about 2½ inches are suitable in the former instance and studs having a length of about 4½ inches in the latter.

It is a very surprising fact that once the union between the handle and the frame has been thus effected the handle can be withdrawn from the frame only by employing a tractive force far in excess of that at which the frame is subject in ordinary use.

I claim:

In a filter press, the combination which combination which comprises wooden frames and plates having two spaced holes in each of the outer side edges thereof, a pair of rails for supporting said frames and plates and metal handles fixedly attached to each of said wooden plates and frames at the opposite sides thereof and firmly secured thereto by substantially cylindrical metal studs driven into said holes thereof in a non-slip, binding metal to wood frictional contact said metal studs being fixedly attached to said metal handles and forming an integral part thereof, the said metal handles comprising a substantially U-shaped handle portion having a top and bottom section integrally united with a substantially perpendicular side section, a pair of spaced, substantially parallel and cylindrical studs integrally attached to the ends of the top and bottom sections of the handle portion and extending outwardly therefrom a predetermined distance in the direction of the holes in the wooden frames and plates, a spur portion integrally attached to the side section of said handle portion and extending downwardly therefrom at substantially right angles to the bottom section thereof and a lug means fixedly attached to the bottom section of the handle portion adjacent to the point at which bottom section is united to the outwardly extending stud attached thereto, said lug being adapted to limit the depth to which said stud enters said hole in said frames and plates, the bottom sections of said handles being aligned on and resting upon said rails with each rail positioned between the lug and spur portions of the respective handles.

References Cited in the file of this patent

UNITED STATES PATENTS

| Number | Name | Date |
|---|---|---|
| D. 22,161 | Wilmot | Jan. 24, 1893 |
| 215,108 | Drevermann | May 6, 1879 |
| 620,716 | Montgomerie | Mar. 7, 1899 |
| 1,337,251 | Miller | Apr. 20, 1920 |
| 1,442,115 | Babel | Jan. 16, 1923 |
| 1,574,790 | Carroll | Mar. 2, 1926 |
| 2,300,924 | Hunziker | Nov. 3, 1942 |
| 2,383,868 | Kraus | Aug. 28, 1945 |
| 2,453,613 | Babbitt | Nov. 9, 1948 |